US012073697B2

(12) United States Patent
Ong et al.

(10) Patent No.: US 12,073,697 B2
(45) Date of Patent: Aug. 27, 2024

(54) METHOD, AN APPARATUS AND A SYSTEM FOR MANAGING AN EVENT TO GENERATE AN ALERT INDICATING A SUBJECT IS LIKELY TO BE UNAUTHORIZED

(71) Applicant: NEC Corporation, Tokyo (JP)

(72) Inventors: Hui Lam Ong, Singapore (SG); Hong Yen Ong, Singapore (SG); Xinlai Jiang, Singapore (SG); Satoshi Yamazaki, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/766,846

(22) PCT Filed: Sep. 2, 2020

(86) PCT No.: PCT/JP2020/033210
§ 371 (c)(1),
(2) Date: Apr. 6, 2022

(87) PCT Pub. No.: WO2021/084895
PCT Pub. Date: May 6, 2021

(65) Prior Publication Data
US 2024/0062635 A1    Feb. 22, 2024

(30) Foreign Application Priority Data
Nov. 1, 2019 (SG) .......................... 10201910218X

(51) Int. Cl.
*G06V 40/00* (2022.01)
*G08B 13/196* (2006.01)
(52) U.S. Cl.
CPC ....... *G08B 13/19602* (2013.01); *G06V 40/00* (2022.01); *G08B 13/19697* (2013.01)

(58) Field of Classification Search
CPC ........ G06V 40/00; G08B 13/00; G08B 13/22; G08B 13/19613; G08B 13/19669
See application file for complete search history.

(56) References Cited

U.S. PATENT DOCUMENTS

2005/0179553 A1* 8/2005 Fujie ................ G08B 13/19613
340/5.1
2020/0025877 A1* 1/2020 Sarkis ..................... G01S 7/412
(Continued)

FOREIGN PATENT DOCUMENTS

JP    2008-198124 A    8/2008
JP    2010-033143 A    2/2010
(Continued)

OTHER PUBLICATIONS

International Search Report for PCT Application No. PCT/JP2020/033210, mailed on Oct. 6, 2020.

*Primary Examiner* — Benyam Haile
(74) *Attorney, Agent, or Firm* — Sughrue Mion, PLLC

(57) ABSTRACT

Present disclosure provides a method for managing an event to generate an alert indicating a subject is likely to be unauthorized, the event comprising data identifying the subject, the method comprising: within a pre-determined period based on a timestamp at which the event is stored in a cache, detecting a recall event comprising the data identifying the subject, the recall event indicating the subject is not likely to be unauthorized; and removing the event from the cache in response to detecting the recall event comprising the data identifying the subject within the pre-determined period.

15 Claims, 10 Drawing Sheets

(56) References Cited

U.S. PATENT DOCUMENTS

2020/0105111 A1\* 4/2020 Messer .................... H04N 7/08
2022/0139109 A1\* 5/2022 Hamami .............. G06V 40/172
                                                                                                    382/118

FOREIGN PATENT DOCUMENTS

| JP | 2016-143118 A | 8/2016 |
|----|---------------|--------|
| JP | 2019-144695 A | 8/2019 |
| WO | 2016/203718 A1 | 12/2016 |

\* cited by examiner

12,073,697 B2

METHOD, AN APPARATUS AND A SYSTEM FOR MANAGING AN EVENT TO GENERATE AN ALERT INDICATING A SUBJECT IS LIKELY TO BE UNAUTHORIZED

This application is a National Stage Entry of PCT/JP2020/033210 filed on Sep. 2, 2020, which claims priority from Singapore Patent Application 10201910218X filed on Nov. 1, 2019, the contents of all of which are incorporated herein by reference, in their entirety.

TECHNICAL FIELD

The present disclosure relates to a method, an apparatus and a system for managing an event to generate an alert indicating a subject is likely to be unauthorized.

BACKGROUND ART

Video analytic for subject identification and recognition has become increasingly popular in recent years. By utilizing algorithms and processing hardware, a video footage can be processed to obtain data for identifying a subject in the video footage. Face recognition is one of the video analytic technologies that is widely used in subject identification. Currently, it has been adopted in public safety solution to assist in law enforcement's investigation, authentication method for e-commerce transaction payment and contactless identity recognition in physical access authorization. In particular, majority of face recognition solutions obtain facial data from a video footage or an image as data identifying a subject, match the facial data identifying the subject against facial data identifying a known or authorized subject, and if both facial data are highly correlated, generate an alert indicating the subject in the video footage or the image is likely to be known or authorized. In various embodiments, an authorized subject may be one who has the permission to enter a premise or has previously entered the premise and is determined to be unlikely to pose a threat.

An unauthorized subject detection system can be implemented through face recognition technology based on the concept of comparing data identifying a subject with data identifying an authorized subject. For example, if the data identifying the subject do not match with the data identifying the authorized subject, an event to generate an alert is detected to indicate that the subject is an unauthorized subject or is likely to be unauthorized. Such unauthorized subject detection system can be useful for detecting potential intruder for example when the intruder or the unauthorized subject enters a premise.

SUMMARY OF INVENTION

Technical Problem

However, some of the limitations and challenges in accuracy of conventional video analytic technologies may get amplified and hinder the application of such video analytic technology into unauthorized subject detection. In particular, conventional video analytic technology may not be able to generate a consistent outcome based on detections of a subject detected under varying environmental or imaging conditions. Under such limitations of accuracy, an alert is immediately generated and provided to the user once there is a possibility of detecting an unauthorized subject. A conventional technique typically does not hold an event (an instruction/a signal) to generate an alert, and manage the event to generate the alert. In short, there is no technique in conventional technologies to minimize alerts that are not supposed to be generated.

Solution to Problem

Therefore, it is an object of present disclosure to substantially overcome the existing challenges as discussed above to manage an event to generate an alert indicating a subject is likely to be unauthorized.

According to a first aspect of the present disclosure, there is provided a method for managing an event to generate an alert indicating a subject is likely to be unauthorized, the event comprising data identifying the subject, the method comprising: within a pre-determined period based on a timestamp at which the event is stored in a cache, detecting a recall event comprising the data identifying the subject, the recall event indicating the subject is not likely to be unauthorized; and removing the event from the cache in response to detecting the recall event comprising the data identifying the subject within the pre-determined period.

According to a second aspect of the present disclosure, there is provided an apparatus for managing an event to generate an alert indicating a subject is likely to be unauthorized, the event comprising data identifying the subject, the apparatus comprising a memory in communication with a processor, the memory storing a computer program recorded therein, the computer program being executable by the processor to cause the apparatus at least to: within a pre-determined period based on a timestamp at which the event is stored in a cache, detecting a recall event comprising the data identifying the subject, the recall event indicating the subject is not likely to be unauthorized; and removing the event from the cache in response to detecting the recall event comprising the data identifying the subject within the pre-determined period.

According to yet another aspect of the present disclosure, there is provided a system for managing an event to generate an alert indicating a subject is likely to be unauthorized, comprising the apparatus in the second aspect and at least one image capturing device, one motion detecting sensor and/or one infrared sensor.

BRIEF DESCRIPTION OF DRAWINGS

The accompanying figures, where like reference numerals and characters refer to identical or functionally similar elements throughout the separate views and which together with the detailed description below are incorporated in and form part of the specification, serve to illustrate various embodiments and to explain various principles and advantages in accordance with present embodiments in which.

DESCRIPTION OF EMBODIMENTS

Figure 1A:
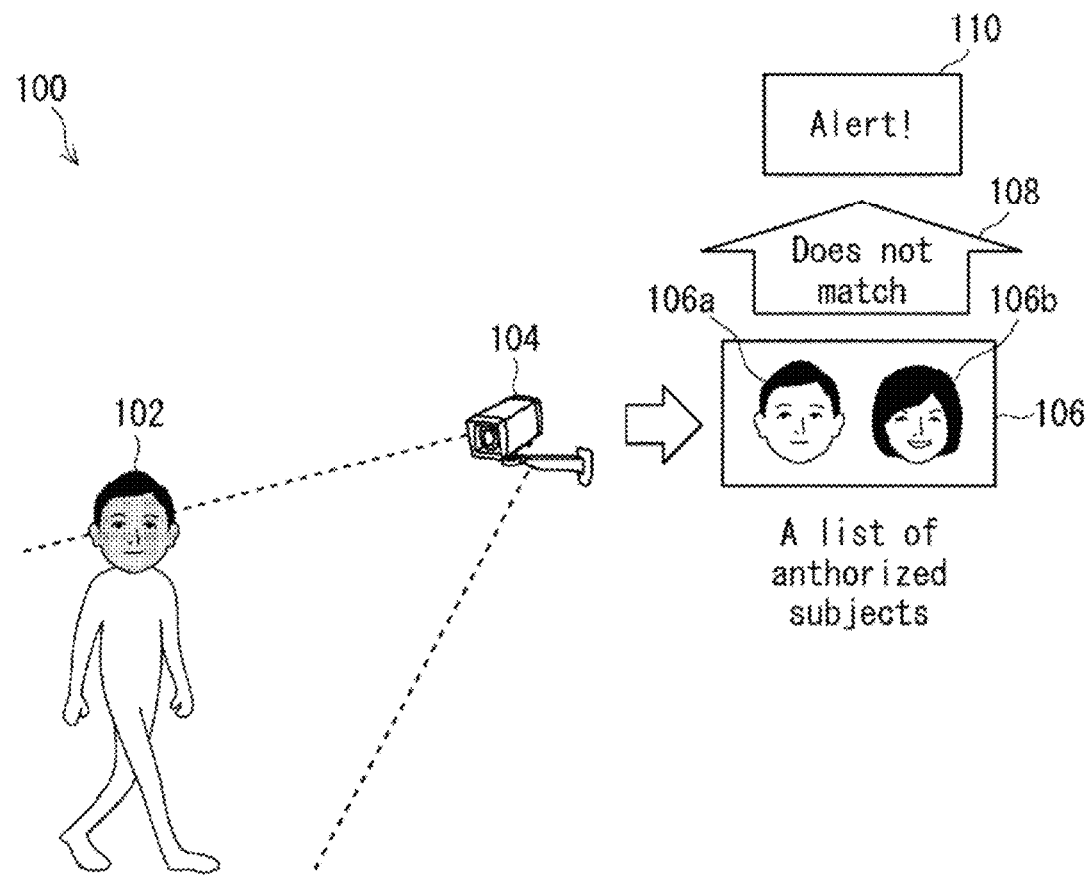
FIG. 1A depicts a system for detecting an event to generate an alert based on an input of an image capturing device according to an embodiment.

Embodiments of the present disclosure will be better understood and readily apparent to one of ordinary skill in the art from the following written description, which provides examples only, and in conjunction with the drawings.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "retrieving", "determining", "replacing", "generating", "initializing", "outputting", "receiving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and display presented herein are not inherently related to any particular computer or other apparatus. Various machines may be used with programs in accordance with the teachings herein. Alternatively, the construction of more specialized apparatus to perform the required method steps may be appropriated. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the internet system, or wireless medium such as exemplified in the GSM mobile telephone system. The computer program when loaded and executed on such as computer effectively results in an apparatus that implements the steps of the preferred method.

In various embodiments, data identifying a subject may refer to information that is associated with or used to identify a subject based on the subject's attributes or characteristic information from an input that is detected by an input device. The attributes or characteristic information can be a physical characteristic of a subject such as height, body size, hair color, skin color, facial information, apparel, belongings, other similar characteristics or combinations, or a behavioral characteristic of a subject such as body movement, position of limbs, direction of movement, moving speed, the way the subject walks, stands, moves, talks, other similar characteristics or combinations, or other attributes or characteristic information. Such data identifying a subject can be obtained from an input such as an image of an imaging capturing device or data of a sensor; on the other hand, data identifying an authorized subject or each subject of a list of authorized subjects can be stored in a database and used to match against data identifying a detected subject obtained from an input to determine if the detected subject is likely to be unauthorized.

In various embodiments below, an event to generate an alert may refer to a signal, instruction or action, which is generated, triggered, handled or recognized by a computer system or similar electronic device, indicating if a subject is likely to be unauthorized. Each event does not cause the alert to be generated immediately upon detecting a subject that is likely to be unauthorized, but instead, each event may go through a further determination step and may be stored in a cache or a memory temporally for a fixed amount of time, i.e. pre-determined period, before the event can cause the alert to be generated. As such, an event indicating a detected subject is likely to be unauthorized can be managed and an alert that is not supposed to be generated can be held, removed and minimized. FIG. 1A depicts a system 100 for detecting an event to generate an alert based on an input of an image capturing device 104 according to an embodiment. The image capturing device 104 captures an image including a subject 102. The subject 102 can be identified as appearing in the image based on characteristic information such as facial information, height, hair color, movement or other similar characteristic information, or combination. Based on data identifying the subject obtained from the characteristic information, the subject 102 is matched against a subject or a list of authorized subjects 106 to determine if the subject 102 is likely to be unauthorized. In this embodiment, the subject 102 is matched against the list of authorized subjects 106, the list of authorized subjects 106 comprising two subjects 106a, 106b and facial information identifying each subject. The facial information of the subject 102 obtained from the image is used to match against the facial information identifying each subject 106a, 106b in the list of authorized subjects 106. As a result of the matching process based on facial information, the subject 102 does not match with any subject in the list of authorized subjects 106, at 108. It is determined that the subject is likely to be unauthorized, and an event to generate an alert 110 is detected. In various embodiments below, such event to generate the alert 110 may be managed before the event can cause the alert 110 to be generated indicating that the subject is likely to be unauthorized.

Figure 1B:
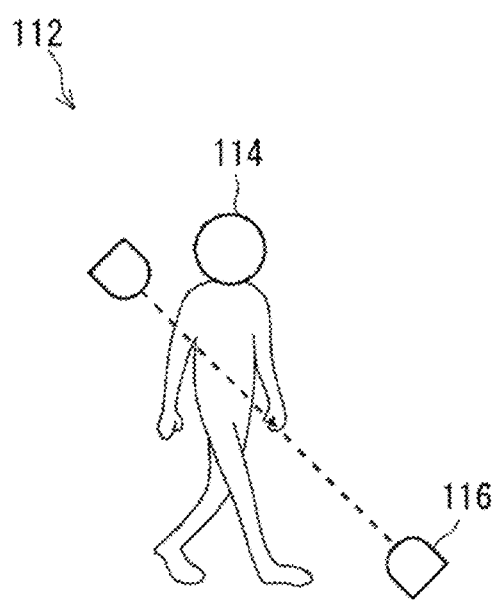
FIG. 1B depicts a system for detecting an event to generate an alert based on an input of an infrared sensor according to an embodiment.
Figure 1C:
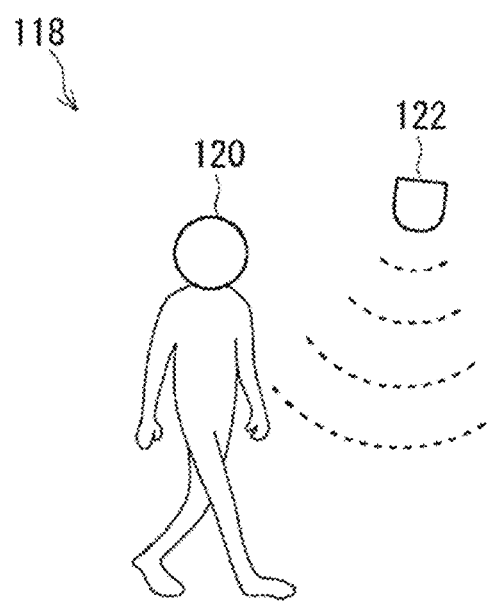
FIG. 1C depicts a system for detecting an event to generate an alert based on an input of a motion detecting sensor according to an embodiment.

FIG. 1B depicts a system 112 for detecting an event to generate an alert based on an input of an infrared sensor 116 according to an embodiment while FIG. 1C depicts a system 118 for detecting an event to generate an alert based on an input of a motion detecting sensor 122 according to an embodiment. Each subject 114, 120 enters an area and a field of detection of an infrared sensor 116 and a motion detecting sensor 122. The subjects 114, 120 are then detected by the infrared sensor 116 and the motion detecting sensor 122 based on characteristic information such as height, body size, temperature, body movement, position of limbs, walking speed, moving path, or other similar characteristic information, or combination. Based on data identifying the subjects 114, 120 obtained from the characteristic information, each subject 114, 120 is matched against a subject or a list of authorized subjects (not shown) in a database to determine if the subjects 114, 120 are likely to be unauthorized. The database may comprise data identifying each subject in the list of authorized subjects, and the data can be input by a system user and/or obtained from previous detections of the authorized subject based on the input of data from received from the database or the sensors 116, 122. The data identifying each subject in the list of authorized subjects may be a combination of characteristic information of height, body size, moving path and movement of limbs. Such data identifying each subject in the list of authorized subjects in the database will be used to compare against data identifying the subjects 114, 120 obtained the sensors 116, 122 to determine if the subjects 114, 120 are likely to be unauthorized. An event to generate an alert is detected if the data identifying the subject do not match with data identifying any subject in the list of authorized subjects in the database. In various embodiments below, such event to generate the alert may be managed before the event can cause the alert to be generated indicating the subject is likely to be unauthorized. In an embodiment, a combination of an image from at least one image capturing device like 104 and data from at least one sensor like infrared sensor 116 or motion detecting sensor 122 can be used as input to obtain data identifying a subject, and detect an event to generate an alert indicating the subject is likely to be unauthorized.

Figure 1D:
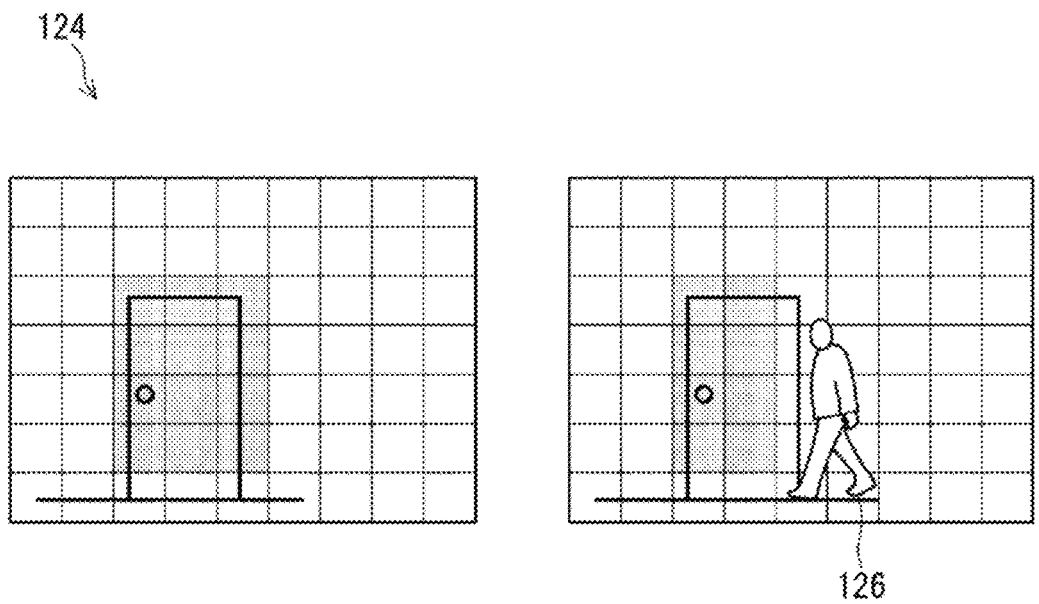
FIG. 1D depicts a system for detecting an event to generate an alert based on an input of an image capturing device with grid-based image processing as motion detection according to an embodiment.

FIG. 1D depicts a system 124 for detecting an event to generate an alert based on an input of an image capturing device with grid-based image processing as motion detection according to an embodiment. A grid-based image processing divides an image into a plurality of grids, each grid represents a portion of the image, as represented in light grey grids in FIG. 1D. Multiple adjoining grids can form an area defined as a pre-defined region of interest, as illustrated as dark grey color grids in FIG. 1D. In this embodiment, the pre-defined region is a door of entrance in FIG. 1D. A motion in the pre-defined region of interest is detected by monitoring the pixel changes based on historical images or video frames, or by comparing with empty background image as illustrated as light grey color grids in FIG. 1D. This may reduce the processing power needed as only a pre-defined region of interest is being monitored, and has been used in many commercial video monitoring applications to automatically capture images when changes detected at the pre-defined region of interest. According to the present disclosure, a subject 126 moving towards the door will be detected as the subject causes a pixel change in the pre-defined region of interest, as illustrated in white color grids in FIG. 1D. Characteristic information of the detected subject for example a physical characteristic of the subject such as height, body size, hair color, skin color, facial feature, or a behavioral characteristic of the subject such as the way the subject walks, stands, moves, in the white color grids may be obtained from the image capturing device. Based on data identifying the subject 126 obtained from the characteristic information of the image, the subject 126 is matched against a subject or a list of authorized subjects (not shown) in a database to determine if the subject 126 is likely to be unauthorized. The database may comprise data identifying each subject in the list of authorized subjects, and the data can be input by a system user and/or obtained from previous detections of the authorized subject based on the input of images received from the database or the image capturing device. The data identifying each subject in the list of authorized subjects may be single or a combination of characteristic information such as facial information and body movement while entering the door. Such data identifying each subject in the list of authorized subjects in the database will be used to compare against data identifying the subject 126 obtained the image capturing device to determine if the subject 126 is likely to be unauthorized. An event to generate an alert is detected if the subject do not match with any authorized subject in the database. Similarly, such event to generate the alert may be managed before the event can cause the alert to be generated indicating that the subject is likely to be unauthorized.

Figure 1E:
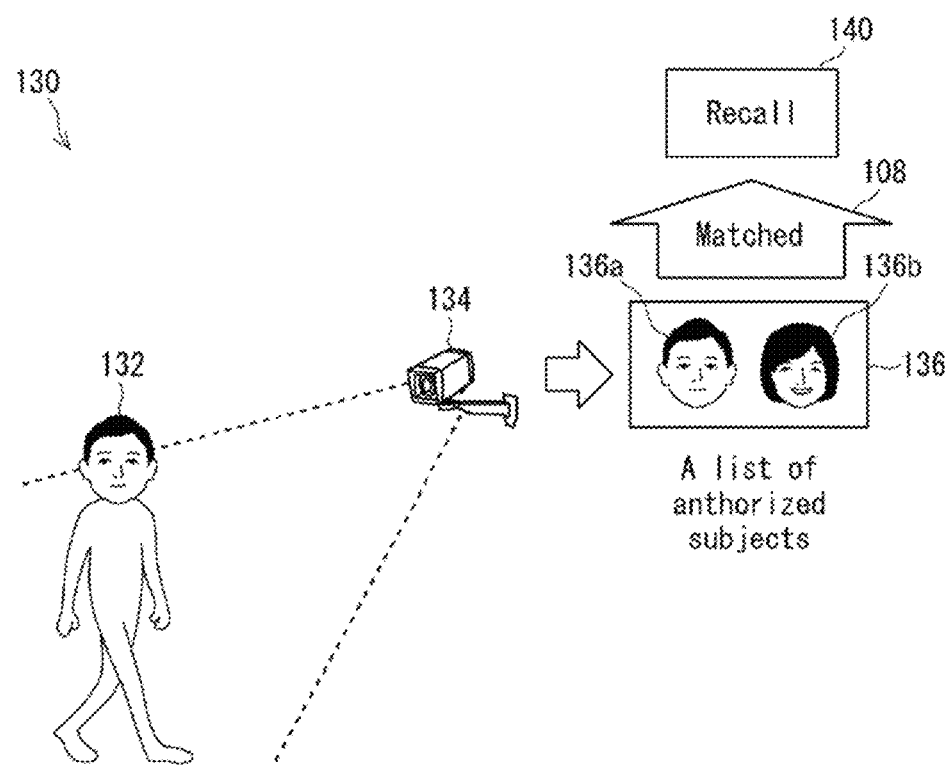
FIG. 1E depicts a system for detecting a recall event based on an input of an image capturing device according to an embodiment.

In various embodiments below, a recall event may refer to a signal, instruction or action, which is generated, triggered, handled or recognized by a computer system or similar electronic device, indicating if a subject is not likely to be unauthorized. A recall event may be detected if it is determined that a subject matches or highly correlated with an authorized subject thus indicating the subject is not likely to be unauthorized. According to the present disclosure, where an event to generate an alert indicating a subject is likely to be unauthorized is stored in a cache or a memory temporally for a fixed amount of time, i.e. a pre-determined period, a recall event detected upon determining that the subject is not likely to be unauthorized can be used to remove the event from the cache or the memory within the pre-determined period such that the alert of the event is not generated. FIG. 1E depicts a system 130 for detecting a recall event based on an input of an image capturing device according to an embodiment. An image capturing device 134 captures an image including a subject 132, and the subject 132 is identified as appearing in the image based on characteristic information such as facial information, height, hair color, movement or other similar characteristic information, or combination. Data identifying the subject 132 is obtained based on the characteristic information from the image. The facial information of the subject 132 is used to match against the facial information identifying each subject 136a, 136b in the list of authorized subjects 136 to determine if the subject is likely to be unauthorized. In this embodiment, the subject 132 matches with one subject in the list of authorized subjects 136, for example subject 136a, at 138. This determines that the subject is not likely to be unauthorized, and therefore a recall event 140 is detected. In various embodiments below, upon detecting a recall event 140, each event to generate an alert stored in a cache will be scanned and determined if the event comprises similar data as the recall event 140. For example, if the recall event 140 and an event to generate an alert stored in the cache comprises similar data such as height, hair color, the data being sufficient to associate the subject 132 of the recall event with a subject of the event stored in the cache as a same subject, upon determining such recall event 140, the event from the cache is removed from the cache, and the alert of the event to generate the alert is not generated. In an embodiment, if the event is stored in the cache and it is not removed from the cache by a recall event like 140 within the pre-determined period, the event will then be freed from the cache after the pre-determined period has expired and the alert is generated indicating the subject is likely to be unauthorized.

Figure 2:
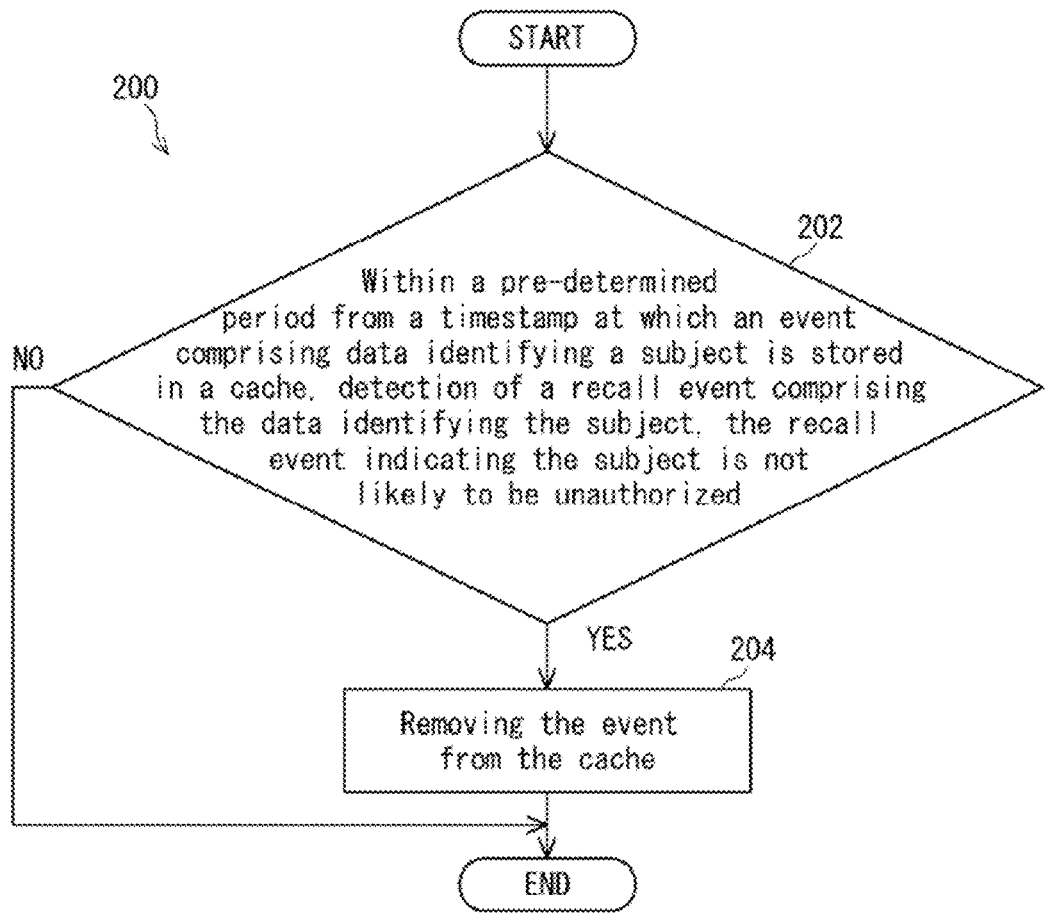
FIG. 2 shows a flow chart illustrating a method for managing an event to generate an alert indicating a subject is not likely to be unauthorized according to an embodiment.

Various embodiments provide apparatus and methods for managing an event to generate an alert indicating a subject is likely to be unauthorized. FIG. 2 shows a flow chart illustrating a method 200 for managing an event to generate an alert indicating a subject is not likely to be unauthorized according to an embodiment. At step 202, the method comprises a step of determining if within a pre-determined period from a timestamp at which an event comprising data identifying a subject is stored in a cache, there is a detection of a recall event comprising the data identifying the subject, indicating that the subject is not likely to be unauthorized. In response to the detection of the recall event within the pre-determined period, at step 204, the method comprises a step of removing the event to generate the alert from the cache.

According to an embodiment, at step 202, the method may comprise a step of calculating a matching score of the data identifying the subject, the matching score referring to a degree of correlation between the data identifying the subject and data identifying an authorized subject. In particular, a matching score is used to scale a degree of correlation between data identifying the subject and data identifying an authorized subject. In an embodiment, a matching score is scaled from 0% to 100%, where a matching score of 0% indicates that both data identifying the subject and data identifying the authorized subject have no correlation or no characteristic information in common, whereas a matching score of 100% indicate that both data identifying the subject and data identifying the authorized subject are fully correlating and identical to each other. The method at step 202 may further comprise a step of determining if the matching score of the data identifying the subject is higher than a matching threshold, wherein the matching score higher than the matching threshold refers to a high degree of correlation between the data identifying the subject and the data identifying the authorized subject. The matching threshold is implemented as a minimum matching score representing a significant degree of correlation between both data identifying the subject and data identifying the authorized subject to be recognized as corresponding to and correlating with each other. In response to determining the matching score higher than the matching threshold, indicating that data identifying the subject and data identifying the authorized subject can be significantly determined as corresponding to and correlating with each other, a recall event is detected indicating the subject is not likely to be unauthorized. In another embodiment, in response to determining the matching score lower than the matching threshold, indicating that there is no significant degree of correlation between the data identifying the subject and the data identifying the authorized subject, an event to generate an alert may be detected indicating the subject is likely to be unauthorized.

In another embodiment, a subject may be matched against a list of authorized subjects, and a matching score is generated upon matching the subject against each subject in the list of authorized subjects. As such, the step of calculating the matching score may comprise a step of calculating a plurality of matching scores, each of the plurality of matching scores referring to a degree of correlation between the data identifying the subject and data identifying a subject of a corresponding plurality of authorized subjects. Subsequently, the matching score of the subject is determined as the highest matching score among the plurality of matching scores, used for determining if the matching score is higher than the matching threshold and determining if the subject is likely to be unauthorized.

According to the present disclosure, the method may further comprise a step of calculating a confidence score of the event to generate the alert, the confidence score referring to a degree of likelihood that the subject is unauthorized. In an embodiment, a confidence score of an event to generate an alert indicating a subject is likely to be unauthorized is scaled from 0% to 100%, where a confidence score of 0% indicates that the subject very unlikely to be unauthorized, and a confidence score of 100% indicates that the subject is very likely to be unauthorized. The method may further comprise a step of determining if the confidence score of the event to generate the alert is lower than a confidence threshold, wherein the confidence score lower than the confidence threshold refers to a low degree of likelihood that the subject is unauthorized. In an embodiment, in response to determining a confidence score lower than the confidence threshold (a low degree of likelihood that the subject is unauthorized), the method may comprise a step of storing the event to generate the alert in the cache, and a step of determining a pre-determined period based on a timestamp at which the determination of the confidence score is done and the event is stored in the cache. In another embodiment, in response to determining a confidence score higher than the confidence threshold (a high degree of likelihood that the subject is unauthorized), the method may comprise a step of generating the alert without storing the event in the cache.

According to an embodiment, the step of calculating the confidence score may comprise calculating the confidence score based on a matching score of the data identifying the subject, and the step of determining if the confidence score is lower than the confidence threshold may be further performed using the confidence score calculated based on the matching score. In other words, a degree of likelihood that a subject is unauthorized can be determined based on the matching score or the degree of correlation between the data identifying the subject and an authorized subject. According to another embodiment, where a detected subject is matched against a list of authorized subjects, the step of calculating the confidence score may comprise calculating the confidence score based on the highest matching score among a plurality of matching scores. In this particular embodiment, a confidence score can be calculated based on the highest matching score among a plurality of matching scores using equation 1:

(math 1)

$$\text{Confidence score} = 100\% - \text{Highest Matching Score} \quad \text{equation (1)}$$

where Highest Matching Score is the highest matching score among a plurality of matching scores, each of the plurality of matching scores representing a matching score scaled from 0% to 100% between the detected subject and one subject in the list of authorized subjects, determined based on a degree of correlation between data identifying the detected subject and data identifying the subject in the list of authorized subjects. In this embodiment, if a subject has a high highest matching score, indicating that the subject is highly correlates to an authorized subject, a low confidence score can thus be resulted and indicates that, due to the relatively high matching score and degree of correlation between data identifying the subject with data identifying the authorized subject, there is a low likelihood that the subject of the event is unauthorized. Such event to generate the alert is then stored in a cache for a pre-determined period so the event can be removed by a recall event. The above calculation of a confidence score based on a matching score or the highest matching score among a plurality of matching scores is one of many examples for calculating a confidence score. Alternatively or additionally, other parameters, indications, scores or calculations may be used to determine a confidence score of an event to generate an alert indicating a degree of likelihood that a detected subject is unauthorized.

Figure 3:
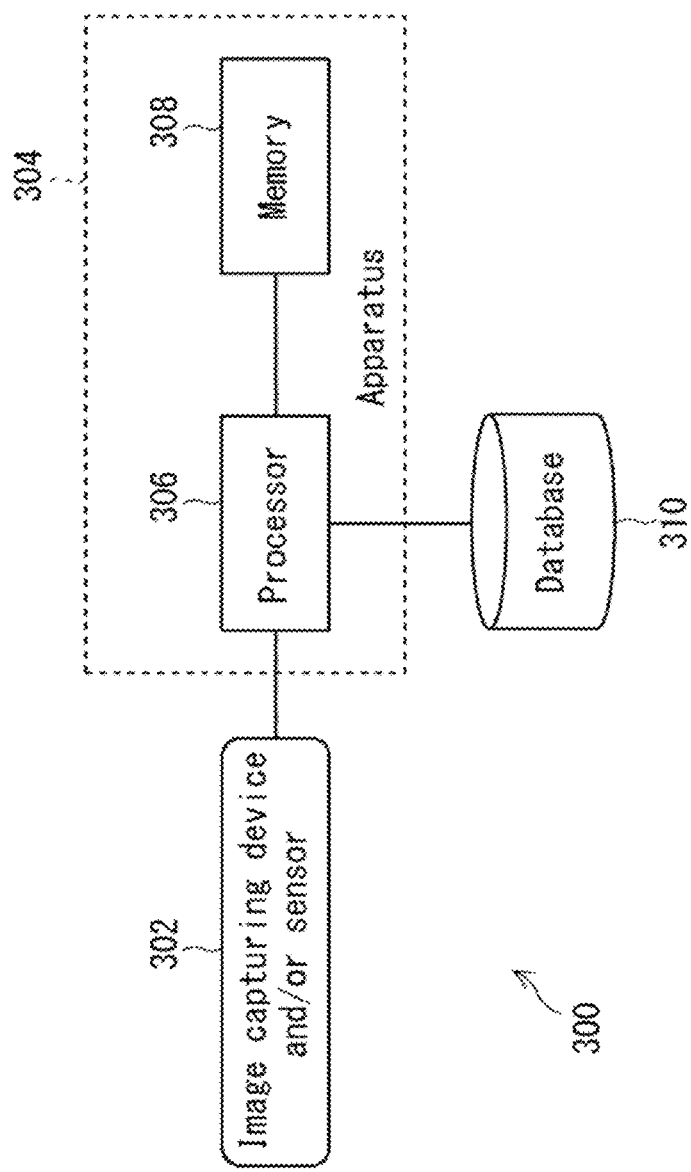
FIG. 3 depicts a block diagram illustrating a system for managing an event to generate an alert indicating a subject is not likely to be unauthorized according to an embodiment.

FIG. 3 depicts a block diagram illustrating a system 300 for managing an event to generate an alert indicating a subject is not likely to be unauthorized according to an embodiment. In an example, the managing of input is performed by at least an image capturing device and/or at least a sensor 302. The system 300 comprises an image capturing device and/or a sensor 302 in communication with the apparatus 304. In an implementation, the apparatus 304 may be generally described as a physical device comprising at least one processor 306 and at least one memory 308 including computer program code. The at least one memory 308 and the computer program code are configured to, with the at least one processor 306, cause the physical device to perform the operations described in FIG. 2. The processor 306 is configured to receive an image or data from the image capturing device and/or the sensor 302 or to retrieve the image or the data from a database 310.

The image capturing device may be a device such as closed-circuit television (CCTV), web-cams, surveillance camera, or other similar devices, or the sensor may be a device such as infrared sensor, motion detecting sensor or other similar devices, which provides a variety of information of which characteristic information and time information that can be used by the system to identify a subject and obtain data identifying the subject. In an implementation, the characteristic information derived from the image capturing device and/or the sensor 302 to identify a subject and obtain data identifying the subject may include physical characteristic information such as height, body size, hair color, skin color, facial feature, apparel, belongings, other similar characteristic or combinations, or behavioral characteristic information such as body movement, position of limbs, direction of movement, the way of a subject walks, stands, moves and talks, other similar characteristic or combination. For example, a facial feature may be used to identify a subject while other characteristic information associated with the subject may be obtained and aggregated as data identifying the subject, and stored in memory 308 of the apparatus 304 or a database 310 accessible by the apparatus 304. In an implementation, the time information derived from the image capturing device and/or sensor 302 may be include timestamp at which each image or data is identified. The timestamps of images and data may be stored in memory 308 of the apparatus 304 or a database 310 accessible by the apparatus 304 to identify a subject and aggregate the characteristic information of the subject as data identifying the subject. It should be appreciated that the database 310 may be a part of the apparatus 304.

The apparatus 304 may be configured to communicate with the imaging capturing device and/or sensor 302 and the database 310. In an example, the apparatus 304 may receive, from the image capturing device and/or sensor 302, or retrieve from the database 310, an image or data as input, and after processing by the processor 306 in apparatus 304, identify and compare data identifying a subject, and generate an output which may be used to managing an event to generate an alert indicating the subject is likely to be unauthorized.

In an embodiment, after receiving an image or data from the image capturing device and/or sensor 302, or retrieving an image or data from the database 310, the memory 308 and the computer program code stored therein are configured to, with the processor 306, cause the apparatus 304 to determine if within a pre-determined period based on a timestamp at which an event is stored in a cache, the event comprising data identifying the subject, detecting a recall event comprising the data identifying the subject, the recall event indicating the subject is not likely to be unauthorized; and removing the event from the cache in response to detecting the recall event comprising the data identifying the subject within the pre-determined period. The timestamp at which the event is stored in the cache may be retrieved from the memory 308 of the apparatus 304 to determine the pre-determined period for detecting a recall event. In an embodiment, the memory 308 of the apparatus 304 may be configured as the cache for storing the event to generate the alert, and the apparatus 304 may be configured to remove the event to generate the alert from the memory 308 in response to a detection of a recall event within a pre-determined time period the event is stored in the memory 308.

The apparatus 304 may be further configured to calculate a confidence score of the event to generate the alert, and determine if the confidence score of the event to generate the alert is lower than a confidence threshold, the confidence threshold being retrieved from the memory 308 of the apparatus 304. In an embodiment, the apparatus may be configured to calculate the confidence score of the event to generate the alert based on a matching score of the data identifying the subject which is retrieved from the memory 308 of the apparatus 304 or the database 310 accessible by the apparatus 304. The apparatus 304 is configured to further determine if the confidence score of the event to generate the alert is lower than the confidence threshold using the confidence score calculated based on the matching score.

In an embodiment, after receiving an image or data from the image capturing device and/or sensor 302, or retrieving an image or data from the database 310, the memory 308 and the computer program code stored therein are configured to, with the processor 306, cause the apparatus 304 to calculate a matching score of data identifying a subject based further on data identifying an authorized subject, and determine if the matching score of the data identifying the subject is higher than a matching threshold. The data identifying the authorized subject may be retrieved from database 310 accessible by the apparatus 304, and the matching threshold may be retrieved from the memory 308 of the apparatus 304. The data identifying the authorized subject stored in the database can be input by a system user or obtained from previous detections of the authorized subjects based on the input of images or data in the database 310 or received from the image capturing device and/or sensor 302. In an embodiment, the apparatus 304 is configured to calculate a plurality of matching scores, each of the plurality of matching scores referring to a degree of correlation between the data identifying the subject and data identifying a subject of a plurality of authorized subjects. Each data identifying a subject of the plurality of authorized subjects may be retrieved from the database 310 accessible by the apparatus 304 for calculating a matching score of the corresponding plurality of matching scores. The data identifying each subject of a plurality of authorized subjects stored in the database 310 can be input by a system user or obtained from previous detections of the authorized subject based on the input of images and/or data from received from the database 310 or the at least one image capturing device and/or at least one sensor 302. The apparatus may further configured to determine the matching score of the data identifying the subject as the highest matching score among the plurality of matching scores.

Figure 4:
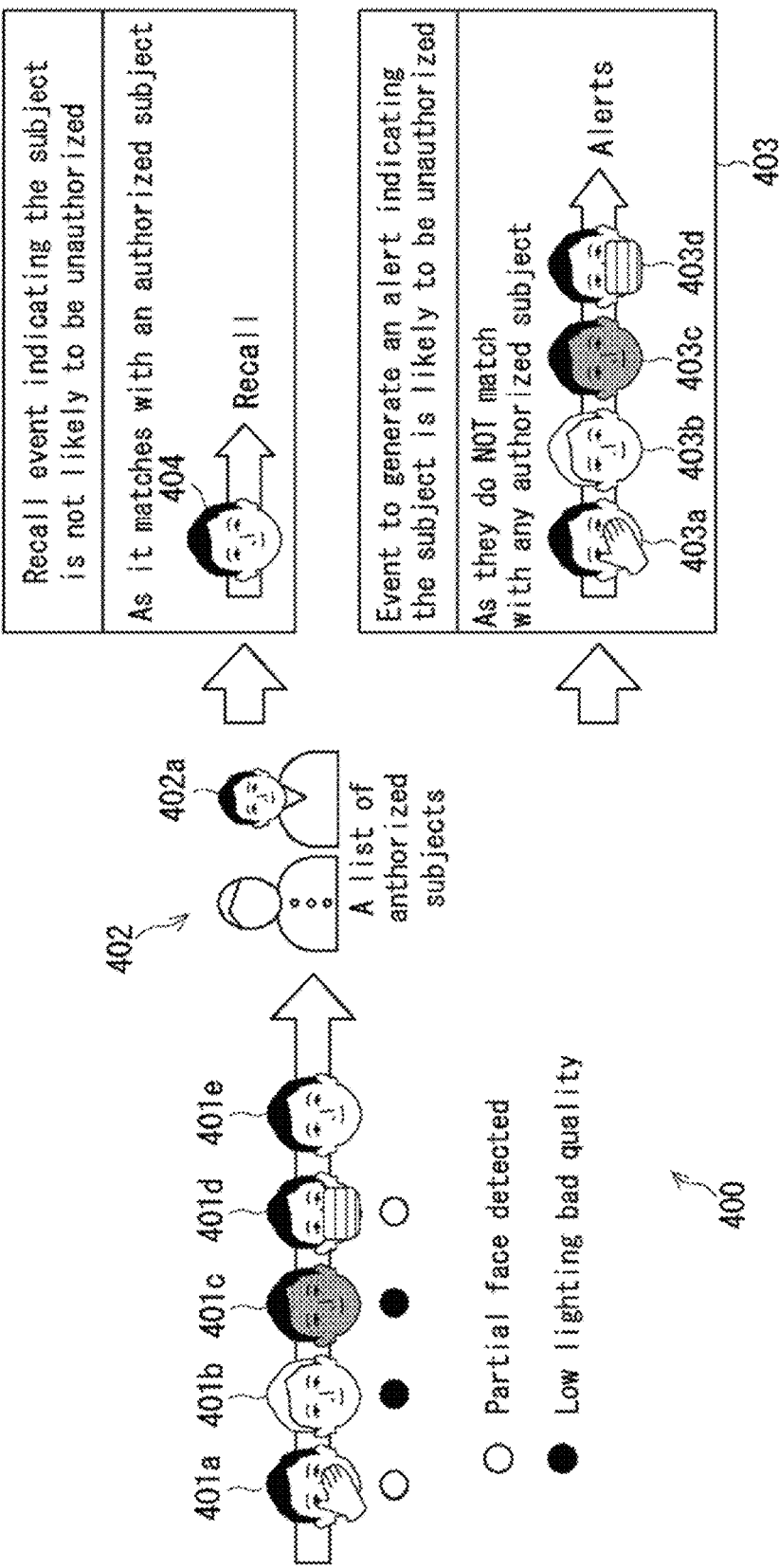
FIG. 4 depicts an example of managing an event to generate an alert indicating a subject is not likely to be unauthorized according to an embodiment.

FIG. 4 depicts an example of managing an event to generate an alert indicating a subject is not likely to be unauthorized according to an embodiment. As mentioned earlier, unauthorized subject detection based on current face recognition technology presents certain limitations under varying environmental and imaging conditions. In this embodiment, five images of a subject 401a-401e are detected under different conditions, and facial information is used to match the subject against a list of authorized subjects 402, and subsequently determine if the subject is likely to be unauthorized. An image 401a is firstly detected. The image 401a may be detected under a condition where the subject face is partially detected. As a result, the subject identified from the image 401a could not match with any subject in the list of authorized subjects 402 based on the lack of complete facial information. The subject in image 401a is determined as being likely to be unauthorized, so an event to generate an alert 403a is detected. An image 401b may be subsequently detected. The image 401b may be detected under a low lighting and bad quality condition. As a result, the subject identified from the image 401b could not match with any subject in the list of authorized subjects 402 based on the unclear facial information. The subject in image 401b is determined as being likely to be unauthorized, so an event to generate an alert 403b is detected. Similarly, subsequent images 401c and 401d, are detected under a condition with a low lighting bad quality condition and partial subject face detected respectively, where the subjects in the images 401c, 401d could not match with any subject in the list of authorized subjects 402, as a result, events to generate the alert 403c, 403d are detected, respectively.

Within a pre-determined period each of the events 403a-403d is stored in the cache 403, as illustrated in FIG. 4, the event can be removed from the cache by a recall event such that the alert is not generated. For example, shortly after the events to generate the alert 403a-403d are detected, a recall event is detected based on a subject in an image 401e with clear and complete facial information that is able to match an authorized subject, for example subject 402a in the list of authorized subjects 402. Upon detecting a recall event, each event in the cache 403 will be scanned and determined if the event comprises similar data as the recall event that can be referred to a single subject. For example, the recall event 404 and the event 403a-403d stored in the cache 403 may comprises data such as "object tracking identification" directed to a single subject which generated by a subject detection module based on common pixel movement tracking of similar subject detection. Alternatively, the recall event 404 and the event 403a-403d stored in the cache 403 may comprises data such as behavioral characteristic information like a same movement direction of the subject and/or a physical characteristic information like a same shirt color or both, the characteristic information being sufficient to associate the subject in any event 403a-d and the subject in the recall event 404 as a single subject. As a result, the recall event 404 may be used to remove the events to generate alerts 403a-403d from the cache 403, and the alerts will not be generated. Through the use of an event to hold an alert and a recall mechanism where a detection of an event to generate an alert indicating a subject that is likely to be unauthorized can be recalled by a subsequent detection of a recall event indicating that the subject is not likely to be unauthorized, an event to generate alert is managed, and generation of an alert that are not supposed to be generated is minimized.

Figure 5:
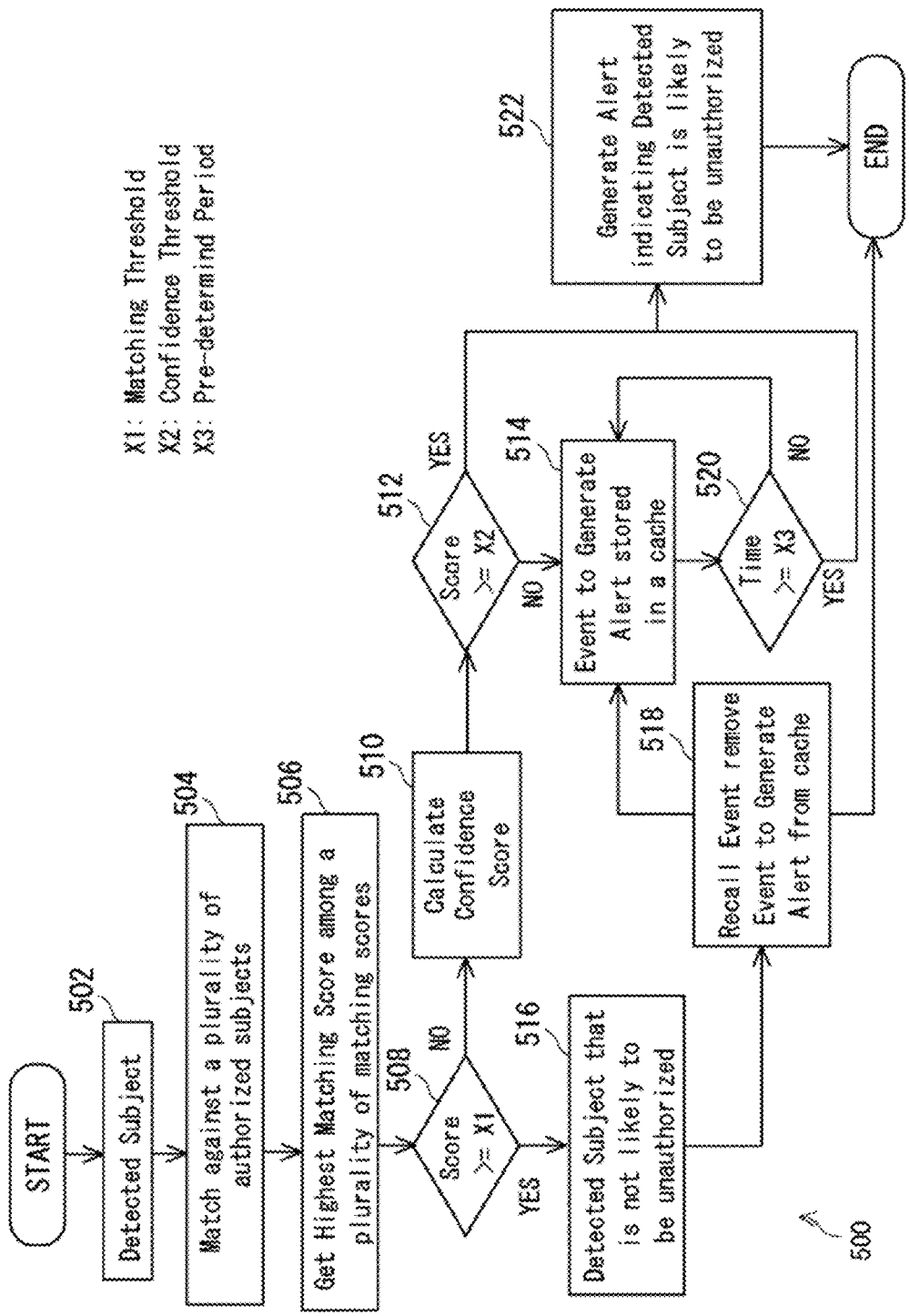
FIG. 5 depicts a flow chart illustrating a method for managing an event to generate an alert indicating a subject is not likely to be unauthorized according to an embodiment.

FIG. 5 depicts a flow chart 500 illustrating a method for managing an event to generate an alert indicating a subject is not likely to be unauthorized according to an embodiment. At step 502, an image and/or data may be received from at least one image capturing device like 104, 134 and/or at least one sensor like 116, 122, or the image and/data may be retrieved from a database 310. A subject is identified based on input of the image and/or data, and data identifying the subject is obtained. At step 504, the subject is matched against each subject of a plurality of authorized subjects based on data identifying the subject obtained from the input and data identifying each subject of a plurality of authorized subjects obtained from a database 310. As a result, a corresponding plurality of matching scores is generated, each matching score indicating a degree of correlation between the subject and a subject in the plurality of authorized subjects. The data identifying each subject of a plurality of authorized subjects stored in the database 310 can be input by a system user or obtained from previous detections of the authorized subject based on the input of images and/or data from received from the database 310 or the at least one image capturing device and/or at least one sensor. At step 506, a matching score of the subject is chosen as the highest matching score among the plurality of matching scores. Further, at step 508, it is determined if the matching score of the subject (the highest matching score) is lower than a matching threshold, an event to generate an alert is detected indicating the subject is likely to be unauthorized. At step 510, a confidence score of the event may be calculated to indicate a degree of likelihood that the subject is unauthorized. In an embodiment, the confidence score of the event can be calculated based on the matching score based on equation 1. At step 512, it is determined if the confidence score of the event is lower than a confidence threshold, indicating there is a low degree of likelihood that the subject is unauthorized, and at 514, the event is stored in the cache such that a recall event can be used to remove the event within a pre-determined period. If the confidence score of the event is higher than a confidence threshold, indicating there is a high degree of likelihood that the subject is unauthorized, the event will directly cause the alert to be generated indicating the subject is likely to be unauthorized at step 522 without storing in the cache.

At step 520, it is determined if a time period of the event stored in the cache exceed the pre-determined period, the event may be freed from cache and generate the alert indicating the subject is likely to be unauthorized, at step 522; or if it is still within the pre-determined period, the event will remain stored for the remaining pre-determined period. Return to step 508, if it is determined that the matching score of the data identifying the subject is higher than the matching threshold; a recall event is detected indicating the subject is not likely to be unauthorized. At step 518, upon detecting such recall event, each event in the cache will be scanned and determined if the event comprises similar data as the recall event identifying a same subject. Where both recall event and the event in the cache comprises similar data referring to a same subject, and such recall event will cause the event to be removed from the cache. As a result of removing the event from the cache, the event will not be determined if the pre-determined period of the event is over at step 520, and subsequently the alert will not be generated indicating the subject is likely to be unauthorized at step 522.

Figure 6:
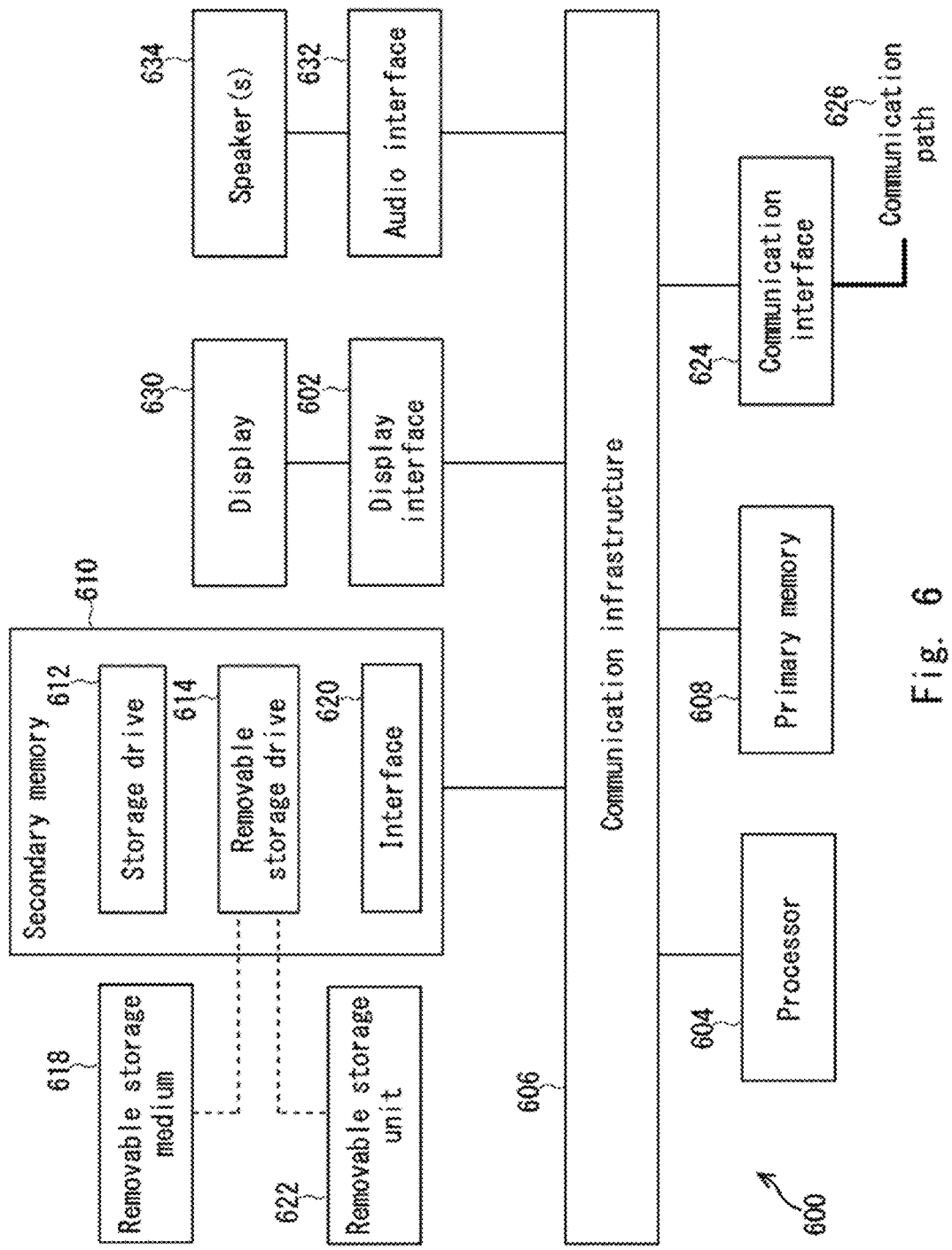
FIG. 6 depicts a schematic diagram of a computer system suitable for use to implement the system shown in FIG. 3.

FIG. 6 depicts an exemplary computing device 600, hereinafter interchangeably referred to as a computer system 600 or as a device 600, where one or more such computing devices 600 may be used to implement the system 300 shown in FIG. 3. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a primary memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 618 in a well-known manner. The removable storage medium 618 may include magnetic tape, optical disk, non-volatile memory storage medium, or the like, which is read by and written to by removable storage drive 614. As will be appreciated by persons skilled in the relevant art(s), the removable storage medium 618 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 620. Examples of a removable storage unit 622 and interface 620 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 620 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the inventions, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1394, RJ45, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 624.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" (or computer readable medium, which may be a non-transitory computer readable medium) may refer, in part, to removable storage medium 618, removable storage unit 622, a hard disk installed in storage drive 612, or a carrier wave carrying software over communication path 626 (wireless link or cable) to communication interface 624. Computer readable storage media (or computer readable media) refers to any non-transitory, non-volatile tangible storage medium that provides recorded instructions and/or data to the computing device 600 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in primary memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 620. The computer program product may be a non-transitory computer readable medium. Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts. For example, the primary memory 608 and/or the secondary memory 610 may serve(s) as the memory 308 for the apparatus 304; while the processor 604 may serve as the processor 306 of the apparatus 304.

It will be appreciated by a person skilled in the art that numerous variations and/or modifications may be made to the present invention as shown in the specific embodiments without departing from the spirit or scope of the invention as broadly described. For example, the above description mainly presenting alerts on a visual interface, but it will be appreciated that another type of alert presentation, such as sound alert, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

This application is based upon and claims the benefit of priority from Singapore patent applications No. 10201910218X, filed on Nov. 1, 2019, the disclosure of which is incorporated herein in its entirety by reference.

REFERENCE SIGNS LIST 100, 112, 118, 124, 130, 300 system
102, 114, 120, 126, 132 subject
104, 134 image capturing device
106, 136, 402 list of authorized subjects
106a, 106b, 136a, 136b subject
110 alert
116 infrared sensor
122 motion detecting sensor
140 recall event
302 image capturing device and/or sensor
304 apparatus
306 processor
308 memory
310 database
401a-401e image
403a-403d alert
403 cache
404 recall event
600 computing device
602 display interface
604 processor
606 communication infrastructure
608 primary memory
610 secondary memory
612 storage drive
614 removable storage drive
618 removable storage medium
620 interface
622 removable storage unit
624 communication interface
630 display
632 audio interface
634 speaker
636 communication path

What is claimed is:

1. A method for managing an event, wherein at least one computer executes:
obtaining a first event based on a first image of a subject;
storing first data for identifying the subject in a cache in response to obtaining the first event;
obtaining a second image of the subject after the first image; and
removing the first data from the cache if a second event based on the second image is detected during a predetermined period from storing the first data in the cache until the predetermined period elapses;
wherein the first event is an event that is detected if the subject is likely to be unauthorized,
the second event is an event that is detected if the subject is unlikely to be unauthorized, and
the first data is data obtained from the first image.

2. The method for managing an event of claim 1, wherein the at least one computer further executes:
acquiring second data for identifying the subject from the second image; and
deleting, from the cache, the first data determined to be the same subject as the subject indicated by the second data when the second event is detected in the predetermined period.

3. The method for managing the event of claim 2, wherein the at least one computer further executes:
calculating a confidence score of the first event, the confidence score referring to a degree of likelihood that the subject is unauthorized; and
determining if the confidence score of the first event is lower than a confidence threshold, wherein the confidence score lower than the confidence threshold refers to a low degree of likelihood that the subject is unauthorized.

4. The method for managing the event of claim 3, wherein the calculating of the confidence score of the first event comprises:
calculating the confidence score based on a matching score of the first data.

5. The method for managing the event of claim 1, wherein the at least one computer further executes, in the detecting of a second event:
calculating a matching score of the second data, the matching score referring to a degree of correlation between the second data and authorized data identifying an authorized subject; and
determining if the matching score of the second data is higher than a matching threshold, wherein the matching score higher than the matching threshold refers to a high degree of correlation between the second data and the authorized data.

6. The method for managing the event of claim 5, wherein the calculating of the matching score of the first data comprises:
calculating a plurality of matching scores, each of the plurality of matching scores referring to a degree of correlation between the first data and a plurality of corresponding authorized data;
wherein the matching score of the first data is the matching score that is highest among the plurality of matching scores.

7. The method for managing the event of claim 1, wherein the first image from at least one image capturing device, or data from at least one motion detecting sensor or at least one infrared sensor, and the detection of the first event is based on the first image.

8. An apparatus for managing an event, comprising:
at least one memory storing instructions; and
at least one processor configured to execute the instructions to:
obtain a first event based on a first image of a subject;
store first data for identifying the subject in a cache in response to obtaining the first event;
obtain a second image of the subject after the first image; and
remove the first data from the cache if a second event based on the second image is detected during a predetermined period from storing the first data in the cache until the predetermined period elapses;
wherein the first event is an event that is detected if the subject is likely to be unauthorized,
the second event is an event that is detected if the subject is unlikely to be unauthorized, and
the first data is data obtained from the first image.

9. The apparatus for managing the event according to claim 8, wherein the at least one processor is further configured to execute the instructions to:
calculate a confidence score of the first event, the confidence score referring to a degree of likelihood that the subject is unauthorized; and
determine if the confidence score of the first event is lower than a confidence threshold, wherein the confidence score lower than the confidence threshold refers to a low degree of likelihood that the subject is unauthorized.

10. The apparatus for managing the event according to claim 8, wherein the at least one is processor further configured to execute the instructions to:
calculate a matching score of the second data, the matching score referring to a degree of correlation between the second data and authorized data identifying an authorized subject; and
determine if the matching score of the second data is higher than a matching threshold, wherein the matching score higher than the matching threshold refers to a high degree of correlation between the second data and the authorized data.

11. The apparatus for managing the event according to claim 10, wherein the at least one processor is further configured to execute the instructions to:
calculate a confidence score based on the matching score of the first data.

12. The apparatus for managing the event according to claim 11, wherein the at least one processor further is configured to execute the instructions to:
calculate a plurality of matching scores, each of the plurality of matching scores referring to a degree of correlation between the first data and a plurality of corresponding authorized data;
wherein the matching score of the first data is the matching score that is highest among the plurality of matching scores.

13. The apparatus for managing the event of claim 8, wherein the first image is from at least one image capturing device, or data from at least one motion detecting sensor or at least one infrared sensor, and
the detection of the first event is based on the first image.

14. A system comprising:
the apparatus for managing the event as claimed in claim 8, and at least one image capturing device, one motion detecting sensor and/or one infrared sensor.

15. A non-transitory computer readable medium storing a program for causing at least one computer to execute:
obtaining a first event based on a first image of a subject;
storing first data for identifying the subject in a cache in response to obtaining the first event;
obtaining a second image of the subject after the first image; and
removing the first data from the cache if a second event based on the second image is detected during a predetermined period from storing the first data in the cache until the predetermined period elapses;
wherein the first event is an event that is detected if the subject is likely to be unauthorized,
the second event is an event that is detected if the subject is unlikely to be unauthorized, and
the first data is data obtained from the first image.

* * * * *